United States Patent
Linde

[15] 3,654,769

[45] Apr. 11, 1972

[54] PROCESS AND APPARATUS FOR THE SEPARATION OF A HYDROGEN-CONTAINING GASEOUS MIXTURE

[72] Inventor: Hermann Linde, Pullach, Germany

[73] Assignee: Linde Aktiengesellschaft Zentrale Patentableilung, Hoellriegelskreuth, Germany

[22] Filed: Oct. 31, 1968

[21] Appl. No.: 772,283

[30] Foreign Application Priority Data

Nov. 3, 1967 Germany.....................P 16 67 594.8

[52] U.S. Cl..........................................62/23, 62/20, 62/39, 252/377
[51] Int. Cl...........................................F25j 3/00, F25j 3/08
[58] Field of Search............................62/11, 12, 20, 23, 39; 252/374, 375, 377

[56] References Cited

UNITED STATES PATENTS

| 2,895,304 | 7/1959 | Wucherer | 62/13 |
| 3,063,247 | 11/1862 | Yendall | 62/13 |
| 3,095,292 | 6/1963 | Ulbrich | 62/12 |
| 3,251,189 | 5/1966 | Jakob | 62/39 |
| 3,312,075 | 4/1967 | Becker | 62/39 |
| 3,327,487 | 6/1967 | Karwat | 62/20 |
| 3,372,555 | 3/1968 | Becker | 62/39 |

Primary Examiner—Norman Yudkoff
Assistant Examiner—Arthur F. Purcell
Attorney—I. William Millen

[57] ABSTRACT

A process and apparatus is provided for separation of a hydrogen-containing gaseous mixture, wherein the gaseous mixture is separated into a condensate fraction and a crude hydrogen fraction containing the hydrogen in addition to other residual components. Separation is accomplished by refrigeration under pressure in at least two reversible regenerators which are charged alternately with crude gas and scavenging gas. The crude hydrogen, after further cooling by partial condensation or by a washing step with liquid nitrogen, is freed of the residues of other components. The purified hydrogen product, which can optionally contain nitrogen, is engine-expanded for the purpose of producing refrigeration and then conducted through heat exchange coils in at least one of the regenerators.

13 Claims, 1 Drawing Figure

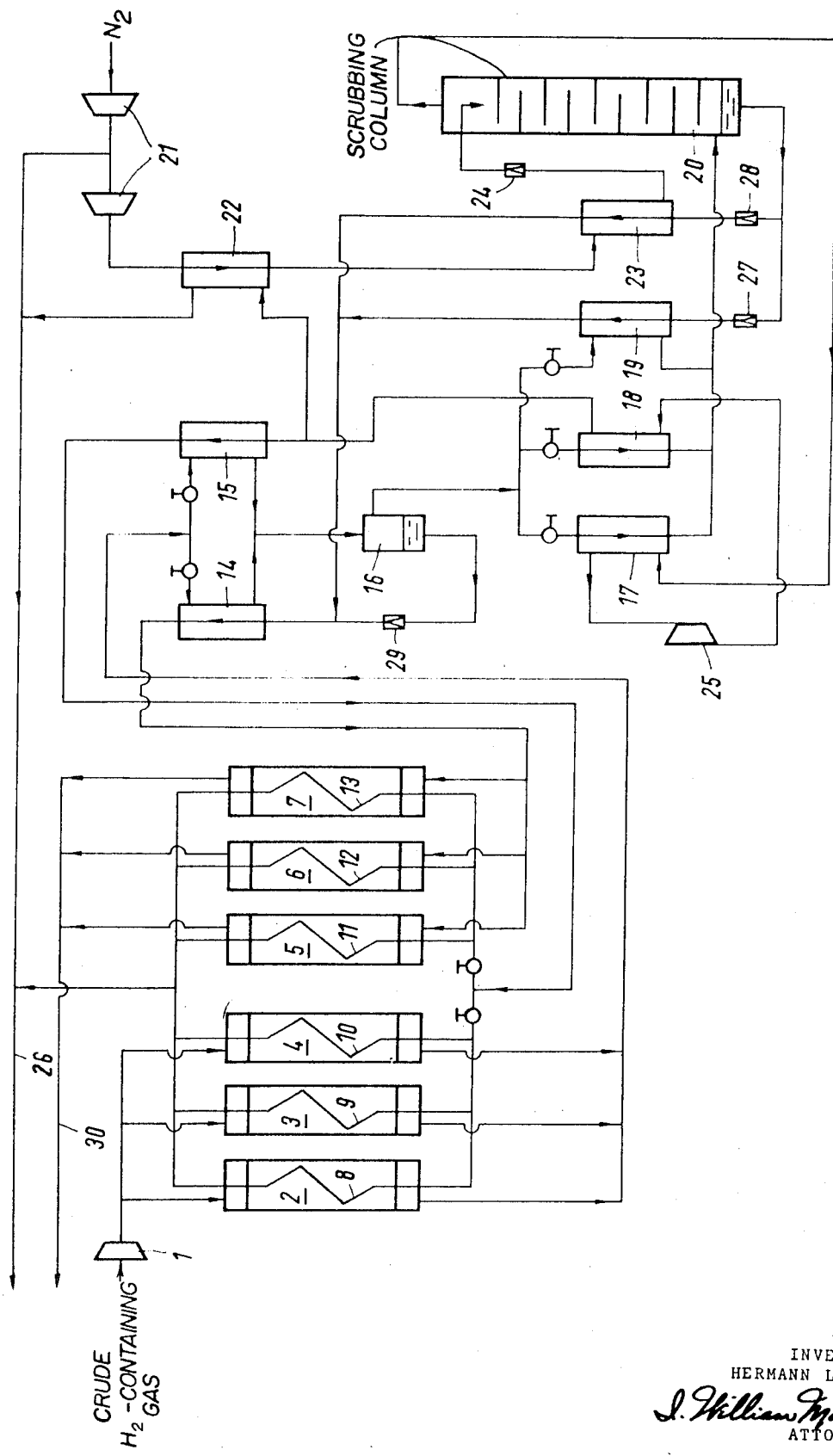

3,654,769

PROCESS AND APPARATUS FOR THE SEPARATION OF A HYDROGEN-CONTAINING GASEOUS MIXTURE

BACKGROUND OF THE INVENTION

In the separation of hydrogen-containing gaseous mixtures, such as coke oven gas, for the purpose of obtaining a hydrogen product which may comprise either pure hydrogen for hydrogenating purposes or a mixture of hydrogen and pure nitrogen as a starting gas for ammonia synthesis, the accompanying substances mixed with the hydrogen, such as carbon dioxide, water, hydrocarbons, and, in particular, hydrogen sulfide and carbon monoxide, must be quantitatively removed before the further utilization of the hydrogen.

For this purpose it is conventional to cool the crude gas under pressure in one of several reversible regenerators to such a degree that the higher-boiling impurities, such as carbon dioxide, water, hydrogen sulfide, and, in part, also hydrocarbons are deposited in the solid phase on the packing of the regenerator (see "KALTETECHNIK" [Refrigeration Technology], Vol. 8, 1964, pp. 239–241). The crude hydrogen exiting from the regenerator is then further cooled in one or several countercurrent heat exchangers so that even lower boiling impurities such as methane and carbon monoxide condense to an extensive or at least partial extent. The regenerators can also be operated in such a manner, however, that a large portion of the methane is already deposited therein. The last stage of the crude hydrogen purification step is, in many cases, a washing procedure with liquid nitrogen, by means of which also the last impurities can be removed from the hydrogen, which latter remains in the gaseous phase. In such a process, the amount of nitrogen removed concomitantly with the purified hydrogen from the head of the washing column is dependent on the pressure and the temperature of the nitrogen washing step. When producing ammonia synthesis gas, the last stage purification is preferably accomplished by liquid-nitrogen washing, since in this manner a substantial portion of the nitrogen required later for the synthesis, evaporates into the crude hydrogen during the course of the purification process of the hydrogen product. As an alternative, it is also possible to employ a reflux condensation (for example, German Patent 725,157) as the last purification stage if the hydrogen product is to be isolated as pure hydrogen.

The refrigeration necessary in the prior art processes is produced by engine-expanding the pure gas, or the gas withdrawn from the head of the nitrogen washing column. The refrigeration thus produced is transferred, in several countercurrent heat exchange coils, to the crude hydrogen and, in the appropriate case, to the washing nitrogen.

The purging of a regenerator loaded with condensates and the subsequent cooling of the regenerator to the temperature of the crude gas treating cycle is carried out by employing as a scavenging gas, residual gas consisting of re-evaporated condensates, previously deposited in the liquid phase, or the evaporated sump liquid from the nitrogen washing column, to which sump liquid, there can further be added methane separated in front of the nitrogen washing column.

The refrigeration transferable to the regenerators by the scavenging gas is not, however, sufficient to condense the components accompanying the hydrogen out of the coke oven gas to a desired extent after the regenerators have been reversed. For this reason, it is necessary, in the prior art processes, to transfer a portion of the refrigeration, remaining in the crude hydrogen after one regenerator, to another regenerator. This is done by conducting a portion of the crude hydrogen in a regenerator, previously extensively cleansed with residual gas, from the cold to the warm end of the regenerator, during which procedure, the crude hydrogen is warmed to room temperature. Apart from this increase in temperature, however, during passage through the regenerator, the crude hydrogen additionally absorbs all residues of non-evaporated condensates and thus must not only be cooled once again, in countercurrent heat exchange, to the temperature of the nitrogen washing step, but must also be subjected to a post-purification step in order to avoid deposits in the countercurrent heat exchangers. This process accordingly requires substantial heat exchange surface, due to the required double cooling and intermediate heating of a portion of the crude hydrogen, and is therefore expensive.

SUMMARY OF THE INVENTION

The present invention provides a process which permits the separation of hydrogen-rich gaseous mixtures with an essentially lower requirement in heat exchange surface area than heretofore available.

This object is achieved in accordance with this invention, by conducting the purified hydrogen product, at least in part, through heat exchange coils embedded in the regenerative beds of the regenerators after the engine-expansion thereof.

The use of heat exchange coils in regenerators for withdrawing uncontaminated products from the gas separation step has been known in air separation processes. Experience gathered during the conductance of air separation processes has shown, however, that the quantity of pure product withdrawn from the plant through the heat exchange coils embedded in the packing of the regenerators must not be greater than about 40 percent by volume (N.T.P.) of the total amount of air being processed since, due to the required enlargement of the heat exchange surfaces for the separation products, the volume of the coils will increase to such an extent that the dimensions of the regenerators would have to be unduly large to maintain the correct ratio of tube volume to packing volume.

The refrigeration, produced for the entire process by engine-expansion of the purified hydrogen, must cool both the crude gas in the regenerators and the high-pressure nitrogen which must be liquefied for any nitrogen washing step that may be conducted. Accordingly, if a nitrogen washing step is to be the final stage of the hydrogen purification process, a portion of the expanded gas must be passed countercurrently to the warm washing nitrogen in a countercurrent heat exchanger, while the remaining portion is passed through the pipe coils of the regenerators. When producing ammonia synthesis gas, where a very nitrogen-rich hydrogen is withdrawn from the head of the nitrogen washing column, however, this latter portion amounts to about 45–75 percent by volume (N.T.P.), far more than 40 percent by volume (N.T.P.) of the processed crude gas.

The same holds also true for the production of a pure hydrogen product from the hydrogen contained in coke oven gas in quantities of about 50–60 percent by volume (N.T.P.) of the processed crude gas. The hydrogen, after the impurities accompanying same are removed, is completely withdrawn through the heat exchange coils of the regenerators if the last purification stage is a reflux condensation. The effect of the latter process can be enhanced by introducing a small amount of liquid nitrogen into the head of the rectifying column. This nitrogen must be cooled by a minor portion of the pure hydrogen, which does not pass through the regenerator coils. In this case, far more than 40 percent by volume (N.T.P.) of the coke oven gas is still conducted through the heat exchange coils of the regenerators. In fact, in the production of hydrogen from coke oven gas, water gas and like gases, the quantity of hydrogen withdrawn through the heat exchange coils amounts to 70–95 percent by volume (N.T.P.) of the hydrogen present in the raw gas.

Accordingly, in view of the prior art, utilization of heat exchange coils in the regenerators for withdrawing pure hydrogen, or of a portion of the nitrogen-hydrogen mixture from the plant appeared, on its face, impossible.

The present invention makes it possible to utilize the advantages of the heat exchange coils in regenerators, known from air separation plants, for the separation of coke oven gas. As compared to air, the quantities of components in crude coke oven gas which must be condensed and congealed in the regenerators is inordinately great and can be as high as up to 25 percent by volume (N.T.P.) of the coke oven gas processed. This means, however, that a considerable proportion of the heat to be exchanged in the regenerators must be exchanged by way of the packing on which the condensates are deposited rather than through the walls of the heat exchange coils. Moreover, the condensation and re-evaporation processes conducted in connection with the deposited components merely represents the exchange of latent heat. When separating coke oven gas and conducting a quantity of pure gas through the heat exchange coils corresponding to 40 percent by volume (N.T.P.) of the amount of coke oven gas, the heat exchange through the walls of the heat exchange coils is substantially lower than in case of air separation, and is far below the value which would result during the air separation process, if separation products comprising 40 percent of the processed amount of air were to be withdrawn through the heat exchange coils. Accordingly, there need not be any enlargement of the heat exchange surfaces in case of coke oven gas regenerators.

In accordance with a further development of this invention, engine-expansion of the hydrogen product, comprising pure hydrogen or a nitrogen-hydrogen mixture, is not complete since, if the gas were to be expanded to a pressure only slightly above atmospheric pressure, just sufficient to overcome the pressure decrease in the heat exchange coils, so that the gas exits from the plant pressureless, the volume flowing through the heat exchange coils would be so great that the capacity and, therefore, the volume of the heat exchange coils would have to be enlarged above and beyond the limit dictated by the dimensions of the regenerator and the packing required for depositing the large amounts of condensate.

If the gas in the expansion turbine is not expanded to a pressure lower than about 2 atmospheres absolute, the expanded gas can be passed through the heat exchange coils at a relatively high velocity which, although producing a relatively large pressure decrease, because of the increased heat exchange efficiency at higher velocities, provides satisfactory heat exchange with a relatively small heat exchange surface, and the refrigeration carried by the expanded gas product can be transferred to the crude gas in a practically quantitative manner in the heat exchange coils.

In accordance with a special embodiment of the idea of this invention, the step of passing cold, expanded gas product through heat exchange coils embedded in the regenerators can be conducted not only during the crude gas processing cycle period, but also during the scavenging gas cycle. By operating the heat exchange coils only during the crude gas treating cycle of the regenerator, the outside walls of the heat exchange coils on which condensates are deposited, as well as the packing during the crude gas treating cycle, are completely freed of deposits during the scavenging gas cycle by the extensively expanded residual gas, when no cold gas flows through the heat exchange coils. A disadvantage is incurred in such a process, however, in that the regenerators change over to the crude gas period while being relatively warm, and therefore cannot purify at optimum efficiency at the beginning of the crude gas treatment cycle, since the refrigeration required during the crude gas cycle is provided only by the gas flowing through the heat exchange coils. This deficiency can be overcome, according to one embodiment of this invention, by passing a portion of the expanded pure gas through the heat exchange coils during the scavenging period, so that the packing of the regenerators is initially at a lower temperature when changing over to the crude gas treating cycle. It has been determined that the amount of the condensates which thereby remain unvaporized is negligible.

The invention will be described in greater detail furthermore with reference to a schematically illustrated embodiment in the accompanying figure showing the production of ammonia synthesis gas from coke oven gas with the aid of a nitrogen washing stage. It should be understood, however, that this invention is equally adapted to the separation of any hydrogen-rich mixture.

In the compressor, about 140,000 Nm³/h of coke oven gas are compressed to between 3 and 13, preferably 8 atmospheres absolute, and enter a set of regenerators 2, 3, and 4 at a temperature of between 273° and 323°, preferably 303° K.

The coke oven gas, which was subjected to a prepurification step, has the following composition:

| | | | |
|---|---|---|---|
| $H_2$ | 56.60% | $C_2H_6$ | 0.70% |
| $N_2$ | 4.10% | $C_3H_8$ | 0.18% |
| CO | 6.60% | $C_{4+}$ | 0.12% |
| $O_2$ | 0.60% | $C_2H_2$ | 0.10% |
| $CH_4$ | 26.94% | $CO_2$ | 1.90% |
| $C_2H_4$ | 2.10% | $H_2S$ | 0.06% |

In addition to the set of regenerators 2, 3 and 4, a further set of regenerators 5, 6, and 7 are provided, which are interchanged with the first set in a manner known in the art, when the first set requires purging. All of the regenerators are equipped with heat exchange coils 8 to 13 embedded in the packing beds thereof.

After passing through the regenerators 2, 3 and 4, the coke oven gas exhibits a temperature between 100° and 130°, preferably about 122° K and is freed practically completely of high-boiling impurities, such as $C_2H_4$, $C_2H_6$, $C_3H_8$, $C_{4+}$, $C_2H_2$, $CO_2$, and $H_2S$, and partially freed of $CH_4$, $O_2$, and CO. This crude hydrogen is cooled in heat exchangers 14 and 15 by evaporating methane and an expanded nitrogen-hydrogen mixture to a temperature between 110° and 120°, preferably 112° K, while about 19,750 Nm³/h of $CH_4$ is separated in the liquid phase and collected in the separator 16. The proportion of about 99,850 Nm³/h remaining in the gaseous phase is cooled in heat exchangers 17, 18, and 19 by an expanded nitrogen-hydrogen mixture and by part of the sump product of the nitrogen scrubbing column 20 to a temperature of between 80° and 90°, preferably 84° K. and introduced, under pressure, into the foot of this column.

About 15,450 Nm³/h of liquid nitrogen are introduced to the head of the nitrogen scrubbing column 20, which nitrogen has been compressed, in compressor 21, to between 10 and 200, preferably 15 atmospheres absolute in two stages, cooled in the heat exchangers 22 and 23, and expanded in a throttle valve 24 to approximately 8 atmospheres absolute. After the throttle expansion, the liquid nitrogen has a temperature of about 85° K.

From the head of the nitrogen scrubbing column 20, about 86,120 Nm³/h of nitrogen-hydrogen mixture are withdrawn at a temperature of between 77° and 85°, preferably about 77° K, heated in the heat exchanger 17 to between 98° and 118°, preferably about 100° K, and engine-expanded in the turbine 25 to between 8 and 2, preferably about 3.2 atmospheres absolute. The thus-expanded gas is then heated again in the heat exchanger 18 to between 98° and 112°, preferably about 100° K and thereafter divided into two partial streams. One partial stream of about 16,350 Nm³/h serves to cool the high-pressure nitrogen in the heat exchanger 22 for the nitrogen scrubbing column 20, whereas the remainder of about 69,770 Nm³/h yields a part of its cold in the heat exchanger 15 and then finally flows through the heat exchange coils 8, 9, and 10 where it cools coke oven gas flowing countercurrently thereto, heating up, during this process, to between 268° and 318°, preferably about 295° K. In this connection, a portion of the nitrogen-hydrogen mixture, for example, between 0 and 50, preferably about 50 percent, can be conducted simultaneously through the heat exchange coils 11, 12, and 13. Both partial streams are combined in conduit 26. For producing the stoichiometric proportion of hydrogen to nitrogen required for ammonia synthesis, about 12,630 Nm³/h of nitrogen compressed to about 2.6 atm. abs. in the first compressor stage of the compressor 21 are admixed to this combined stream. In total, about 98,750 Nm³/h of ammonia synthesis gas at about 2.5 atm. abs. are obtained in this manner.

The sump of the nitrogen scrubbing column 20 containing all of the impurities from the coke oven gas which were not condensed in the regenerators or in the separator 16, in the amount of about 29,180 Nm³/h, is first expanded in the throttle valves 27 and 28, then evaporated in the heat exchangers 19 and 23, and finally combined with liquid methane from the separator 16, which methane was expanded in the throttle valve 29. The entire residual gas yields a portion of its refrigeration to crude hydrogen in the heat exchanger 14 and is then passed under pressure through the packing of the regenerators 5, 6, and 7 in order to sublime the condensates deposited in the preceding regenerating period. Through conduit 30, about 69,330 Nm³/h of residual gas are withdrawn under a pressure of about 1.03 atm. abs.

It is seen from the drawing that none of the purified hydrogen product is passed in direct contact with regenerator packing. This means that none of the pure hydrogen is contaminated.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, with the full range of equivalence of the following claims.

What is claimed is:

1. In a low temperature process for the separation of a hydrogen product from a hydrogen containing gaseous mixture wherein entering gaseous mixture is separated by cooling under pressure into a condensate fraction and a gaseous crude hydrogen fraction in at least two reversible regenerators charged alternatively with crude gas and scavenging gas, the crude hydrogen fraction being subsequently purified and then engine-expanded to provide refrigeration, the improvement comprising:

conducting at least a portion of the purified hydrogen product optionally containing nitrogen in heat exchange with two parallel streams of gaseous crude hydrogen fraction in a first set of parallel heat exchangers to rewarm said purified hydrogen product both before and after engine expansion; further rewarming the engine expanded hydrogen product stream in one of a second set of parallel feed stream heat exchangers, said rewarming resulting in the cooling and partial liquefaction of the gaseous crude hydrogen fraction; expanding the liquid formed by said partial liquefaction and passing resultant expanded liquid in heat exchange with the feed stream in another of said second set of parallel heat exchangers; subsequently conducting the rewarmed hydrogen product through heat exchange coils disposed in the beds of at least one of said regenerators, said portion being at least 45 percent by volume (N.T.P.) of the entering gaseous mixture, whereby it is unnecessary to split a sidestream of cold gas having traversed one of said reversible regenerators to cool another of said regenerators, and to recool resultant heated sidestream.

2. A process in accordance with claim 1 wherein the volume of said at least a portion of the expanded purified hydrogen product amounts to about 45 to 75 percent by volume (N.T.P.) of the entering gaseous mixture.

3. A process in accordance with claim 1 wherein the volume of said at least a portion of the expanded purified hydrogen product amounts to about 70 to 95 percent by volume (N.T.P.) of the hydrogen present in the entering gaseous mixture.

4. A process in accordance with claim 1 wherein the purified hydrogen product is conducted solely through heat exchange coils in the regenerator charged with crude gas.

5. A process in accordance with claim 1 wherein the purified hydrogen product is simultaneously conducted through heat exchange coils of both said regenerator charged with crude gas and said regenerator charged with scavenging gas.

6. A process in accordance with claim 1 wherein the expanded purified hydrogen product is divided into two partial streams prior to said further rewarming of same, the first of said partial streams being conducted through heat exchange coils in at least one of said regenerators, and the second of said partial streams being passed in heat exchange relationship with high pressure nitrogen prior to feeding thereof to the nitrogen scrubbing step.

7. A process in accordance with claim 1 wherein the purified hydrogen product is expanded to a pressure of about 2-8 atm. abs.

8. A process in accordance with claim 1 wherein said at least a portion of the expanded purified hydrogen is in combination with nitrogen in the form of ammonia synthesis gas.

9. A process in accordance with claim 4 wherein said at least a portion of the expanded purified hydrogen is in combination with nitrogen in the form of ammonia synthesis gas.

10. A process in accordance with claim 5 wherein said at least a portion of the expanded purified hydrogen is in combination with nitrogen in the form of ammonia synthesis gas.

11. An apparatus for separating a hydrogen product from a hydrogen containing gaseous mixture, comprising a scrubbing column, at least two reversible regenerators, the warm ends of which are in communication with a source of hydrogen containing gas and the cold ends of which are in communication with the lower section of said scrubbing column, the regenerators being provided with heat exchange coils, the cold ends of which are in communication with the upper section of said scrubbing column, an expansion turbine having an inlet side and an outlet side;

a first set of parallel heat exchangers for rewarming a purified hydrogen product before and after passage through said expansion turbine, one of said heat exchangers being connected to the upper section of said scrubbing column and the inlet side of said expansion turbine, and another of said first set of heat exchangers being connected to the outlet side of said expansion turbine, each of said first set of parallel heat exchangers having flow paths for passing crude hydrogen from the regenerators to the scrubbing column whereby said crude hydrogen is further cooled prior to entering said scrubbing column;

a second set of parallel heat exchangers, one of said second set being in communication with said another heat exchanger of said first set for further rewarming of the rewarmed expanded purified hydrogen in heat exchange against crude hydrogen leaving the regenerator, whereby said crude hydrogen fraction is subjected to partial liquefaction;

a phase separator in communication with said one of said second set of heat exchangers for collecting liquid condensed therein;

expansion means for expanding said liquid, the high pressure side of which being connected to the phase separator;

another of said second set of parallel heat exchangers being connected to the low pressure side of said expansion means, whereby expanded liquid is passed in heat exchange against crude hydrogen leaving the regenerator, both of said heat exchangers of said second set having flow paths for said crude hydrogen, and conduit means for effecting said connections an for passing resultant further rewarmed expanded purified hydrogen from said one heat exchanger of said second set to the cold ends of said heat exchange coils in the regenerator.

12. A process as defined by claim 1 wherein none of the purified hydrogen product is passed in direct contact with regenerator packing.

13. A process in accordance with claim 1 wherein the volume of said at least a portion of the expanded purified hydrogen product amounts to about 50 to 60 percent by volume (N.T.P.) of the entering gaseous mixture, said hydrogen-containing entering gaseous mixture being coke oven gas.

* * * * *